UNITED STATES PATENT OFFICE.

HAL POND EASTMAN, OF NIAGARA FALLS, ONTARIO, CANADA, ASSIGNOR TO THE AMERICAN CYANAMID COMPANY, OF NEW YORK, N. Y., A CORPORATION OF MAINE.

ALKALI METAL CYANID AND PROCESS OF PRODUCING SAME.

1,282,395.      Specification of Letters Patent.      Patented Oct. 22, 1918.

No Drawing.      Application filed March 10, 1917. Serial No. 154,029.

*To all whom it may concern:*

Be it known that I, HAL POND EASTMAN, a citizen of the United States, temporarily residing at Niagara Falls, in the county of Welland and Province of Ontario, Canada, have invented certain new and useful Improvements in Alkali Metal Cyanids and Processes of Producing Same; and I do hereby declare the following to be a full, clear, and exact description of the invention, such as will enable others skilled in the art to which it appertains to make and use the same.

This invention relates to a process of transforming cyanamid salts into cyanids and has for its object to improve the somewhat similar process heretofore proposed.

With this and other objects in view the invention consists in the novel steps and combinations of steps constituting the process, all as will be more fully hereinafter disclosed and particularly pointed out in the claims.

In order to clearly distinguish my invention from the prior art it is said:—It has been heretofore proposed to manufacture calcium cyanid, mixed with an alkali metal chlorid according to the process disclosed in the U. S. Letters Patent to Erlwein and Frank #708,333, dated September 2, 1902, and in which the following reaction is said to take place when calcium cyanamid is fused in a mixture of carbon and a suitable metal chlorid:—

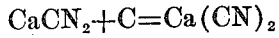

$$CaCN_2 + C = Ca(CN)_2$$

I have, however, found by actual trial that the reaction occurring in connection with this said patented process is not the simple reaction stated; and that if one follows the disclosure of said patent, although he will obtain a cyanid product, yet the efficiency of the said patented process in every case is so low as to render the same commercially impossible under the conditions existing in this country. That is to say it is probable that one of the reasons for this low impossible commercial efficiency is due to the fact that the patented process relies upon the premixing of calcium cyanamid and carbon with a metal chlorid and the subsequent fusion of this mixture to obtain calcium cyanid, whereas as a matter of fact, the calcium cyanamid should be added after the metal chlorid is fused and any carbon as such other than that carried by the said cyanamid should be omitted altogether. Owing to these and other defects in the patented disclosure, I do not believe it is possible to carry out the process under the conditions stated in the patent and attain an efficiency sufficiently high to render it commercially practicable.

In fact, I have been informed that in a test of this said patented process carried out by others, three runs on different days were made, and that the product obtained on the first run analyzed only 6.5% cyanid. That in run number 2, the product analyzed only 8.8% cyanid, and in the third run the product analyzed only 13.3% cyanid. In this latter case the furnace seemed to freeze up with a large infusible mass of unknown composition, and it required two or three hours to mechanically remove it. The time required, I am informed, to obtain the cyanid counting from the addition of the salt to the furnace to the time of pouring the charge, amounted to about 10 to 12 hours for each run.

Upon testing this said patented process myself I met with the same general results.

For example, I took one part of calcium cyanamid and mixed the same with two parts or more of sodium chlorid, as disclosed in said patent, and then fused the mixture in a suitable furnace, whereupon I found the proportion of calcium cyanamid converted into cyanid to be in every case comparatively small.

In fact, I have demonstrated by repeated tests in which I employed a mixture of 200 pounds of calcium cyanamid and 500 pounds of sodium chlorid that there resulted a product containing only 11.7% of cyanid. In such case the efficiency of the transformation into cyanid of the nitrogen in the cyanamid present is only 58.8% and the foaming which takes place in the heated mass is considerable.

I further made a test involving the fusion of 500 pounds of common salt NaCl to which was added 200 pounds of calcium cyanamid mixed with 50 pounds of coke dust, whereupon I obtained a product containing only 9% of cyanid. The foaming of the mass in this case also was considerable. In this latter test, the materials were not premixed as in the former case, but the salt was first melted in the furnace, and the lime nitrogen was added as fast as the foaming, which always occurs in such procedures, had subsided. The adding of the lime nitrogen in this latter case covered a period of about 1¼ hours. The time required to produce the product in this latter case, counting from the addition of the salt to the furnace to the pouring of the mass, was found to be about 6 hours. Although this time is much shorter than in the other tests mentioned above, yet, it was found to be so long that the process for this reason alone was rendered commercially not attractive, and especially was this the case when the high cost of the labor and power involved was considered.

On the other hand, in carrying out the present invention, I have discovered that commercially successful results can be obtained if one proceeds as follows:—

In the same furnace as used above, I charge, for example, 400 pounds of sodium chlorid, preferably in the form of coarsely crushed rock salt, and the mass is melted down without any admixture of carbon to complete fluidity. Into this molten bath I then charge say 200 pounds of calcium cyanamid, preferably in the form of the well known lime nitrogen, and the charging of the said lime nitrogen is preferably done almost as rapidly as it is possible to shovel it into the furnace. The whole without any carbon other than that carried by the lime nitrogen is then left to react until a maximum percentage of sodium cyanid is formed which is conveniently determined by chemical analysis and an examination of the physical properties of the bath. It is observed, however, that this sudden addition of the cold lime nitrogen cools the molten sodium chlorid somewhat, and when the mixture is stirred it becomes more or less pasty. In this invention, as now disclosed, the foaming although still considerable, as in all the other cases mentioned, is yet found not to be excessive. The charge just mentioned is found to be worked off, or the reaction itself completed in about two hours, and the entire process from the charging of the salt to the pouring of the product, requires only about four hours.

In fact, I have demonstrated from the average results of 27 furnace runs, each employing charges of about 200 pounds of lime nitrogen and 400 pounds of common salt, that the reactions themselves are complete in about two hours from the time of first charging the salt as against a reaction period of from four to six hours in the case of the premixed patented process, or in the case of the charge above mentioned in which coke dust was added.

The average product of these 27 runs analyzed 17.8% sodium cyanid NaCN, as opposed to 11.7% of cyanid for the premixed charge, and against 9% cyanid for the charge in which coke dust was introduced. The percentage efficiency with which nitrogen in the cyanamid was transformed into sodium cyanid averaged 76.3% for the above 27 runs as against 58.8% of cyanid for the patented premixed charge and against 47% for the charge which was not premixed and in which coke dust was added.

These differences surely cannot be ascribed to the fact that a larger amount of salt was used in the premixed charge, or in the charge in which coke had been added, because there is found to be practically no loss of weight in the furnace operation, and therefore, the said differences are greater than would be the case were they caused by a mere dilution with more salt.

Although I am unable to explain with certainty the exact scientific reasons for these remarkable results, yet, I believe that these tests show that the premixing of the charge or the addition of coke to the charge as required by the patent, serves to increase the time of furnacing as well as the foaming of the mass, and therefore, there inevitably results a corresponding loss of efficiency in the transformation of the nitrogen and a lowering of the percentage of cyanid in the product, both of which evil results are avoided in the present invention.

In carrying out this present process, although the foaming is not as great as that found to take place in the patented process, yet the said foaming is considerable as above stated, and as it is objectionable for reasons about to be stated, I next searched out means to absorb the escaping nitrogen accompanying said foaming as well as to destroy the foaming itself.

This foaming is very objectionable for it injures the physical properties as well as the commercial value of the final product. It produces a loosely coherent, spongy, mass which is difficult to handle on account of its dusty nature, and one that is readily attacked by moisture giving off hydrocyanic gas-HCN with its accompanying danger to the workmen employed. Said foaming and consequent porosity of the product further very materially increase the cost of the expensive packing required for shipment of the material, because of the bulky nature of the resulting product.

In other words, it is evident that any process that can eliminate this foaming will not only very greatly increase the output of a given furnace, but it will also enable one to materially cheapen the cost of packing and transportation as well as lessen the danger to employees handling the material.

In the above attempts to avoid these most serious objections I have further discovered that the addition to the charge in the furnace of calcium carbid $CaC_2$, preferably in a finely divided condition, will very materially and almost completely eliminate this said foaming as well as very greatly lessen the total time required to produce the final product. I also further discovered that when this said foaming is thus eliminated, that I can by simply pouring the melted product from the furnace, cast it into solid homogeneous cakes of very much greater density than is possible under the patented process or is possible under the process of this invention where no such addition of calcium carbid is had.

I made 37 runs charging into each about 400 pounds of coarsely crushed rock salt without any admixture of carbon, melted the same down to a fluid condition and then added a mixture of 200 pounds of lime nitrogen and varying amounts of finely ground calcium carbid as fast as it could be charged into the furnace. I found that the actual amounts of calcium carbid that are to be added may vary within wide limits and may be easily determined by watching the effect it has in decreasing the foaming. In most cases up to 15% of the total charge of calcium carbid going into the furnace produces excellent results.

The average time consumed in these 37 runs from the starting of the charge of salt into the furnace to the pouring out of the product, I found to be reduced to one hour and 35 minutes, as opposed to the 10 to 12 hours required by the process disclosed in said U. S. Patent #708,333, as opposed to six hours in the above mentioned test carried out by me, and employing carbon, and as opposed to four hours required by the 27 runs above mentioned.

I further found that the average in the final product of these 37 runs showed an efficiency of 87% in the transformation of cyanamid nitrogen into cyanid nitrogen. Another most important advantage of adding the calcium carbid resides in the fact that I can cast the product directly from the furnace into the iron containers used for shipping it, without danger of foaming during the pouring operation; and I further found that I could place approximately 100 pounds or nearly one third more material in a given container than is possible when casting a foaming product from the furnace.

From a close study of the furnace reactions of the present process, I believe them to be in no sense as simple as one might suppose from a reading of the above mentioned U. S. Patent #708,333. As to just what they are in fact I am unable to say with certainty, but I believe them to proceed according to the following equations:—

(a) $CaCN_2 + 2NaCl = CaCl_2 + Na_2CN_2$
(b) $Na_2CN_2 + C = 2NaCN$

These reactions seem to represent the correct principles of the process, for lime nitrogen owing to its process of manufacture contains free carbon which is partly graphitic in character. This carbon is therefore more or less dense depending upon the actual system of manufacture employed, and it is found to be very difficult indeed to make this said dense carbon react with a high efficiency in a cyanid furnace. Calcium carbid $CaC_2$ on the other hand, when added to the charge probably breaks down, at a red heat, to a form in which it will no longer yield acetylene when treated with water, and it thus probably produces an additional amount of carbon which is in what we might call a nascent state, and therefore, ready for an immediate reaction with any sodium cyanamid $Na_2CN_2$ that may be formed. I therefore believe that the nascent carbon derived from this said carbid reacts with the said sodium cyanamid almost as fast as it is formed to produce sodium cyanid NaCN. Whatever may be the true explanation it is a fact that by following the procedure above outlined, I not only attain a high efficiency of nitrogen conversion, but I avoid at the same time the objectionable foaming in the furnace.

I have further discovered that the best results are attained when the temperature is raised during the reaction up to say 1100° C. or even up to 1200° C. or up to 1400° C., for at such temperatures said free carbon carried by the lime nitrogen becomes quite active. It is needless to say that such temperatures would be impossible on account of the excessive foaming were no carbid added to the charge.

The composition of matter produced by the above described process is found to vary somewhat in its impurities but in addition to containing considerably more than 15% by weight of sodium cyanid NaCN, it contains more or less sodium chlorid, calcium oxid and free carbon. It also frequently contains some lime nitrogen, or calcium cyanamid, and alumina, together with traces of silica, iron and magnesium. While I prefer to use sodium chlorid in practising this invention, of course, other alkali metal chlorids may be employed.

It will now be clear that my process as outlined above produces a much higher percentage of a cyanid product than can be obtained by that described in the prior art; that it enables me to get much larger charges into a furnace of given dimensions due to the elimination of foaming; that it enables me to dispense with a considerable portion of the furnace labor required by other processes in order to handle the excessive foaming they involve; that it enables me to produce a denser product that is more economical in packing and shipping; that it further enables me to cut down the time of reaction and consequently the consumption of electrical energy as well as the labor required, thus effecting a reduction of overhead plant charges to a very economical point, and all through a different manipulation of the charge materials and by the addition of comparatively small quantities of inexpensive reagents.

It is naturally possible for any one skilled in the art to vary the details of the above procedure as well as the proportions of the different reagents involved without departing from the spirit of the invention and therefore, I do not wish to be limited to the above disclosure except as may be required by the claims.

What I claim is:—

1. The process of producing a cyanid compound from a cyanamid of an alkali earth metal which consists in melting sodium chlorid and adding to the molten bath thus produced a quantity of said cyanamid sufficient to form the desired cyanid, substantially as described.

2. The process of producing an alkali-metal cyanid from a cyanamid salt which consists in fusing an alkali metal chlorid and adding to said fused chlorid a sufficient quantity of said cyanamid salt to produce the desired cyanid, substantially as described.

3. The process of producing an alkali-metal cyanid from an alkaline earth metal cyanamid containing carbon as an impurity which consists in melting an alkali-metal chlorid and adding to said molten chlorid a sufficient quantity of said cyanamid to form the desired cyanid, substantially as described.

4. The process of producing an alkali-metal cyanid from an alkali earth cyanamid which consists in adding said cyanamid to an alkali metal chlorid while in a heated condition; and causing said cyanamid and chlorid to react while maintaining the mixture above the melting point of said chlorid, substantially as described.

5. The process of producing an alkali-metal cyanid from an alkali earth cyanamid which consists in causing said cyanamid to mix with an alkali metal chlorid below the melting point of the latter and then heating the mass to a sufficiently high temperature to form the desired cyanid, substantially as described.

6. The process of producing sodium cyanid from an alkali earth cyanamid which consists in adding said cyanamid to sodium chlorid while in a molten condition; adding to the mixture an alkali earth carbid; and causing said cyanamid and chlorid to react while maintaining the mixture above the melting point of said chlorid, substantially as described.

7. The process of producing an alkali-metal cyanid from an alkali earth cyanamid which consists in causing said cyanamid to react with an alkali metal chlorid above the melting point of the latter and in the presence of calcium carbid, substantially as described.

8. The process of producing cyanids consisting in providing a molten bath of sodium chlorid; adding thereto sufficient lime nitrogen to produce the desired cyanid; and maintaining said bath above its melting point until the reaction has taken place, substantially as described.

9. The process of producing cyanid of sodium consisting in melting a bath of sodium chlorid; adding thereto lime nitrogen; and maintaining the bath at a temperature above 850° C. until the reaction is substantially complete, substantially as described.

10. The process of making sodium cyanid consisting in melting a bath of sodium chlorid; adding thereto lime nitrogen and calcium carbid; and maintaining the bath above 900° C. until the reaction is substantially complete, substantially as described.

11. The process of making sodium cyanid consisting in melting a bath of sodium chlorid; adding thereto lime nitrogen and combined inorganic carbon in the form of an alkaline earth metal carbid; maintaining the bath above its melting point until the reaction is substantially complete; and pouring the same from the reaction furnace, substantially as described.

12. The process of preventing foaming in reacting upon an alkali metal chlorid with calcium cyanamid, which consists in adding calcium carbid to the reacting mixture, substantially as described.

13. The process of hastening the reaction between calcium cyanamid and sodium chlorid in the production of sodium cyanid which consists in adding calcium carbid to the charge and maintaining the temperature above 1100° C., substantially as described.

14. The process of decreasing the foaming heretofore produced when reacting on lime nitrogen with sodium chlorid during the process of forming sodium cyanid, which consists in liberating nascent carbon in the reacting charge, substantially as described.

In testimony whereof I affix my signature in presence of two witnesses.

HAL POND EASTMAN.

Witnesses:
G. E. Cox,
O. D. MALLAM.